United States Patent [19]

Klein et al.

[11] Patent Number: 4,636,225
[45] Date of Patent: Jan. 13, 1987

[54] DRYING OF GASES WITH MULTI-LAYER ADSORPTION BEDS

[75] Inventors: Guenter Klein, Neuried; Hans-Juergen Wernicke, Geretsried, both of Fed. Rep. of Germany

[73] Assignee: Linde Aktiengesellschaft, Wiesbaden, Fed. Rep. of Germany

[21] Appl. No.: 714,736

[22] Filed: Mar. 22, 1985

[30] Foreign Application Priority Data

Mar. 23, 1984 [DE] Fed. Rep. of Germany ....... 3410815

[51] Int. Cl.⁴ ............................................. B01D 53/04
[52] U.S. Cl. ........................................... 55/31; 55/33; 55/35; 55/59
[58] Field of Search ................... 55/31, 33, 35, 62, 68, 55/75, 59

[56] References Cited

U.S. PATENT DOCUMENTS

| | | | |
|---|---|---|---|
| 3,102,013 | 8/1963 | Skarstrom | 55/31 |
| 3,109,722 | 11/1963 | Dow | 55/33 X |
| 3,150,942 | 9/1964 | Vasan | 55/31 |
| 3,267,644 | 8/1966 | Jacobowsky | 55/33 |
| 3,359,707 | 12/1967 | Jean | 55/33 |
| 3,513,631 | 5/1970 | Seibert et al. | 55/33 |
| 3,691,251 | 9/1972 | Bauer | 55/31 X |
| 3,719,025 | 3/1973 | Heinze et al. | 55/31 |
| 3,808,773 | 5/1974 | Reyhing et al. | 55/31 |
| 3,841,058 | 10/1974 | Templeman | 55/33 |
| 4,153,428 | 5/1979 | Saunders et al. | 55/33 X |
| 4,273,621 | 6/1981 | Fornoff | 55/33 X |

FOREIGN PATENT DOCUMENTS 2064137  9/1971  Fed. Rep. of Germany .

Primary Examiner—Robert Spitzer
Attorney, Agent, or Firm—Millen & White

[57] ABSTRACT

For drying a gaseous stream in thermally regenerable cyclically connected adsorbers wherein the gaseous stream contains components polymerizable under regeneration conditions, the bed is subdivided into several layers having different adsorbents. The first layer consists essentially of an adsorbent, e.g., zeolite type 4A, having a higher adsorption capacity for polymerizable compounds than the second layer, e.g., zeolite type 3A but with the second layer adsorbent being mechanically more stable than the first layer adsorbent.

18 Claims, 4 Drawing Figures

DRYING OF GASES WITH MULTI-LAYER ADSORPTION BEDS

BACKGROUND OF THE INVENTION

This invention relates to an adsorption process for drying a gaseous stream and in particular, wherein the gaseous stream is fed, during an adsorption phase, to the inlet of an adsorber and, after passing through an adsorption bed, the dried gaseous stream is withdrawn from the outlet end of the adsorber, and wherein, after termination of the adsorption phase, a purge gas introduced via the outlet end of the adsorber is passed through the adsorber at an elevated temperature, and purge gas loaded with desorbed steam is withdrawn from the inlet end of the adsorber.

A process of this type is described in DAS 2,064,137. However, difficulties arise in utilizing such a process for the drying of a gas containing polymer-forming components. Such components include, for example, unsaturated hydrocarbons or aldehydes found, for example, in synthesis gases or in cracked gases. These components are normally adsorbed during an adsorption phase, but not entirely desorbed during regeneration at elevated temperature since a portion thereof is converted under the regenerating conditions into polymers. The thus-formed polymers coat the surface of the adsorbent thereby resulting in a decrease in the adsorption capacity of the adsorber.

In order to avoid this undesirable effect, an adsorbent can be employed which prevents adsorption of polymer-forming components. Especially suitable for this purpose are zeolitic molecular sieves of the 3A type. However, the use of such adsorbents is frequently impossible, since they are very sensitive mechanically and can readily disintegrate into dust and fragments.

Both of the conventional procedures are less than desirable inasmuch as the adsorbent must be replaced after a relatively short period of time.

SUMMARY OF THE INVENTION

An object of this invention is to provide an improved process of the type discussed above along with associated equipment, especially to provide longer-lasting operating periods for an adsorber.

Upon further study of the specification and appended claims, further objects and advantages of this invention will become apparent to those skilled in the art.

These objects are obtained by providing that, when drying a gaseous stream containing components tending to polymerize under the conditions of the adsorption process, the adsorption bed is subdivided into at least two layers containing different adsorbents. The gaseous stream traverses a first layer and then traverses a second layer consisting essentially of an adsorbent having a lower adsorption capacity for polymerizable compounds than the first layer.

In an adsorber used for removing $H_2O$, three zones are to be distinguished with respect to the $H_2O$ loading; namely: a saturation zone neighboring the inlet region of the adsorber, next a downstream mass-transfer zone, and finally an $H_2O$-free zone neighboring the outlet end. The saturation zone is understood to be the region of the adsorber which, at the end of an adsorption phase, is saturated with steam (gaseous $H_2O$) up to the equilibrium loading while the mass-transfer zone is the region of the adsorber which is partially loaded with steam at the completion of an adsorption phase. During the subsequent regeneration, the mass-transfer zone as well as the saturation zone are forced back toward the inlet end of the adsorber whereas they are advanced again during a subsequent adsorption phase.

The underlying realization upon which this invention is based is that polymer formation in the area of the saturation zone is low, whereas it is high within the mass-transfer zone and especially in the $H_2O$-free zone. This appears to be due to the fact that steam is more strongly adsorbed than the polymer-forming materials so that, with progressive saturation of the adsorber with steam, the polymer-forming materials, initially adsorbed within the saturation zone, are displaced by steam and are readsorbed in the mass-tranafer zone or in the $H_2O$-free zone. When using a zeolitic molecular sieve as the adsorbent, an additional effect occurs during regeneration whereby the molecular sieve acts as catalyst for polymer formation, the catalyst activity decreasing with an increasing $H_2O$-loading on the molecular sieve.

Owing to the different tendencies toward polymer formation in the adsorber, it is possible to utilize different adsorbents within the individual regions of the adsorber, the properties of these adsorbents being respectively adapted to the special requirements in the individual zones. In regions of high $H_2O$-loading, it is thus possible to employ adsorbents which, though displaying a relatively high tendency toward polymer formation, have other, important advantages, for example high mechanical stabiltiy. In regions of low $H_2O$-loading and in the $H_2O$-free zone, in contrast, it is suitable to employ a drying agent having a low tendency toward polymer formation in order to maintain the adsorption capacity of the drying unit as long as possible, i.e. in order to avoid rapid reduction in the $H_2O$ adsorption capacity by the deposition of polymer. The region of high $H_2O$-loading, in this connection, means the zone which, during adsorption, is loaded with $H_2O$ up to at least 50% of the equilibrium load attainable under the adsorption conditions; the saturation zone, in particular, is covered by this region. The adsorbents utilized in this region are to have better mechanical properties than those adsorbents to be utilized in the second zone, especially with respect to their stability, particularly against hydrothermal damage and mechanical distintegration due to desorption cold perhaps coupled with the simultaneous presence of condensing desorbates.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

Figure 1:
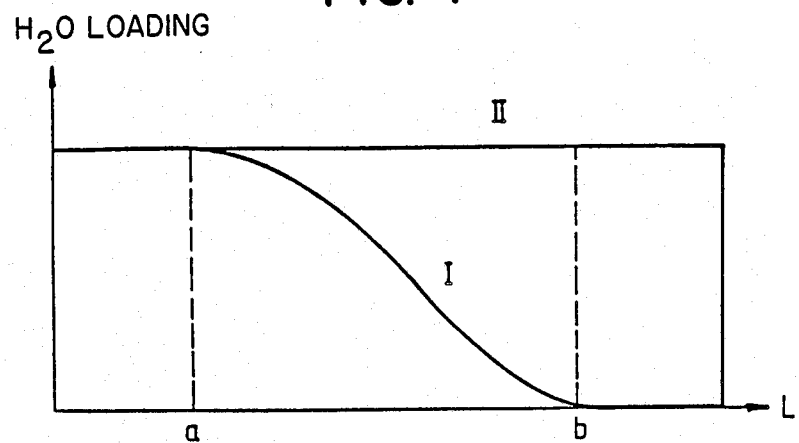
FIGS. 1-3 are diagrams qualitatively illustrating the processes taking place within the zones of an adsorber.
Figure 2:
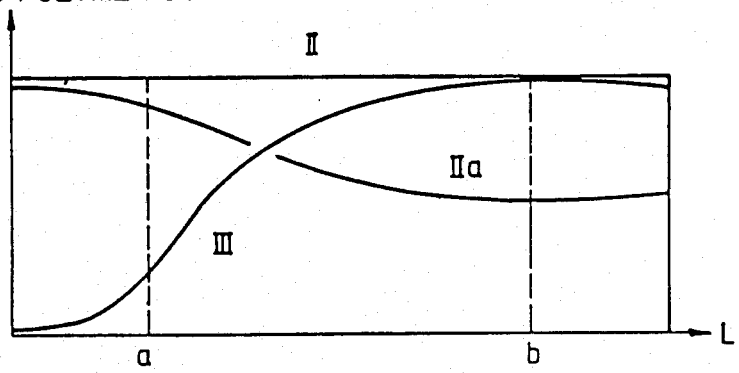
Figure 3:
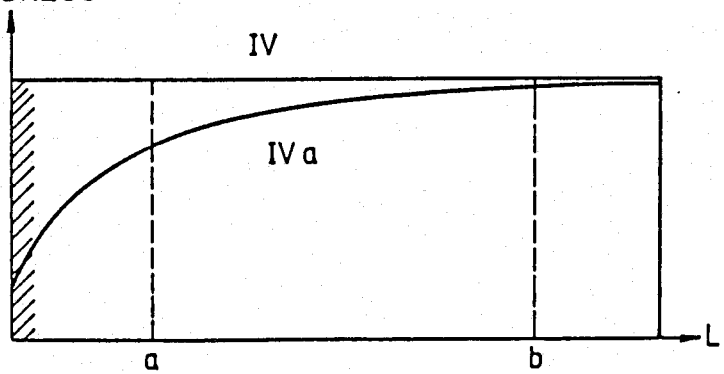

In the diagrams illustrated in FIGS. 1-3, the adsorber length L is plotted on the abscissa; it is assumed in each case that, during an adsorption phase, the gas to be dried is introduced into the adsorber from the left so that the purified product gas exits on the right. The regenerating gas is conducted countercurrently thereto, i.e., it enters the adsorber on the right and leaves on the left.

In the diagram of FIG. 1, the $H_2O$-loading of an adsorber at the termination of an adsorption phase is plotted on the ordinate. The adsorber is completely saturated with steam from the inlet end up to the line a shown in dashed lines; this region, usually occupying between 10% and 75% especially between 40% and 60% of the adsorber length, is the saturation zone of the adsorber. The following mass-transfer zone lies between the dashed lines a and b and generally occupies between 25% and 90%, especially between 40% and 60% of the adsorber length. In this latter zone, the $H_2O$-loading drops from the saturation value to a maximally low residual value given by the regenerating conditions. Thus, line b represents the end of the adsorption front within the adsorber. The zone following the mass transfer zone remains constantly free of $H_2O$ during normal operation of the adsorption process and constitutes a safety zone to ensure the discharge of a dry product gas inrrespective of fluctuations in operating or feed conditions, this safety zone generally constituting about 0% to 30%,, of the adsorber length. The $H_2O$ loading front characterized by line I is forced back, during a regeneration, toward the left, i.e. toward the inlet end of the adsorber, and is again advanced into the illustrated position during a subsequent adsorption phase. Curve II (the upper horizontal line) corresponds to the equilibrium $H_2O$ capacity of the adsorbent which can be reached in case of complete saturation of the adsorber with steam. However, during practical adsorption operation, this curve cannot be followed, since it would correspond to an advance of line a to the outlet end of the adsorber, and would result in humid product gas being discharged even long before this condition had been attained.

In FIG. 2, the equilibrium water capacity and the polymer content are illustrated in a conventional adsorber containing, for example, zeolitic molecular sieve of type 4A, after a relatively long operation, e.g., at least 3 months for drying a synthesis gas. While line II again corresponds to the equilibrium $H_2O$-adsorption capacity of an adsorber newly placed on stream, the line IIa shows a decrease in equilibrium $H_2O$-adsorption capacity after a relatively long operation, e.g., at least 3 months. It can clearly be seen that only a small reduction in $H_2O$-adsorption capacity occurs within the saturation zone whereas the $H_2O$-adsorption capacities in the mass-transfer zone and the safety zone are severely diminished. The concentration of polymers within the adsorber is illustrated by curve III. While the adsorber newly placed on stream is free of polymer the polymer content rises, after a relatively long operating period, e.g., at least as long as 3 months, in correspondence with curve III from a low value within the saturation zone to high values within the mass-transfer zone and especially the dry safety zone.

FIG. 3, finally, shows the typical curves for the hardness of an adsorbent, especially a zeolitic molecular sieve of type 3A. While the line IV corresponds to the hardness of the freshly charged adsorbent, line IVa represents the curve after a relatively long operating time, e.g. at least as long as 3 months. As can clearly be seen, the hardness and thus the mechanical stability is greaterly reduced, especially in the region of the saturation zone, due, for example, to hydrothermal damage and mechanical disintegration caused by the temperature drop associated with desorption coupled perhaps with the simultaneous presence of condensing desorbates. In the inlet zone of the adsorber, the formation of fragments and dust occurs after a relatively long operating period, e.g., at least as long as 3 months, when using a mechanically unstable zeolitic molecular sieve, e.g., of the 3A type; this is indicated by the shading in FIG. 3. This results in a serious disadvantage insofar as the discharge of dust can occur during countercurrent regeneration of the adsorber which, in turn, can lead to clogging in other parts of the plant.

The solution to this problem is made, according to this invention, by providing an adsorbent in the inlet zone, especially within the saturation zone, which adsorbent has a high mechanical stability, the hardness curve of which, after a relatively long operating period, is therefore not subject to, or less pronouncedly subject to, the dependency indicated by curve IVa in FIG. 3. An adsorbent suitable for this purpose is, for example, a zeolitic molecular sieve of type 4A; however, other adsorbents are also suitable for this purpose, such as, for example, alumina gel, silica gel, or other molecular sieves. However, since these adsorbents would lead, within the mass-transfer zone as well as the dry safety zone, to unfavorable results in accordance with the curves shown in FIG. 2, namely to much shorter useful lifetimes for the adsorbent due to the great reduction in $H_2O$ loading capacity requiring more frequent regeneration cycles requiring higher associated heat input etc. Consequently, according to this invention, in the mass-transfer and safety zone an adsorbent is utilized exhibiting no tendency or, at most, a very low tendency, toward adsorption of polymer-forming components. For this purpose, a zeolitic molecular sieve of the 3A type is provided highly preferred.

The multi-layer packing of an adsorber according to this invention is especially advantageous if the adsorbers must be regenerated under a high pressure, e.g., at least as high as 10 bar, especially higher than 15 bar, since in countercurrent pressure regeneration, the mechanical stress on the drying agent within the saturation zone is especially high due to an accumulation and partial condensation of the desorbed components.

In conducting the adsorption process on an industrial scale, there are always at least two adsorbers, at least one adsorber in all cases being in the adsorption phase while the other is being regenerated. After termination of the adsorption phase of one adsorber, the crude gas to be dried is then introduced into the other, previously regenerated adsorber, and operation is continued in cyclic alternation.

Figure 4:
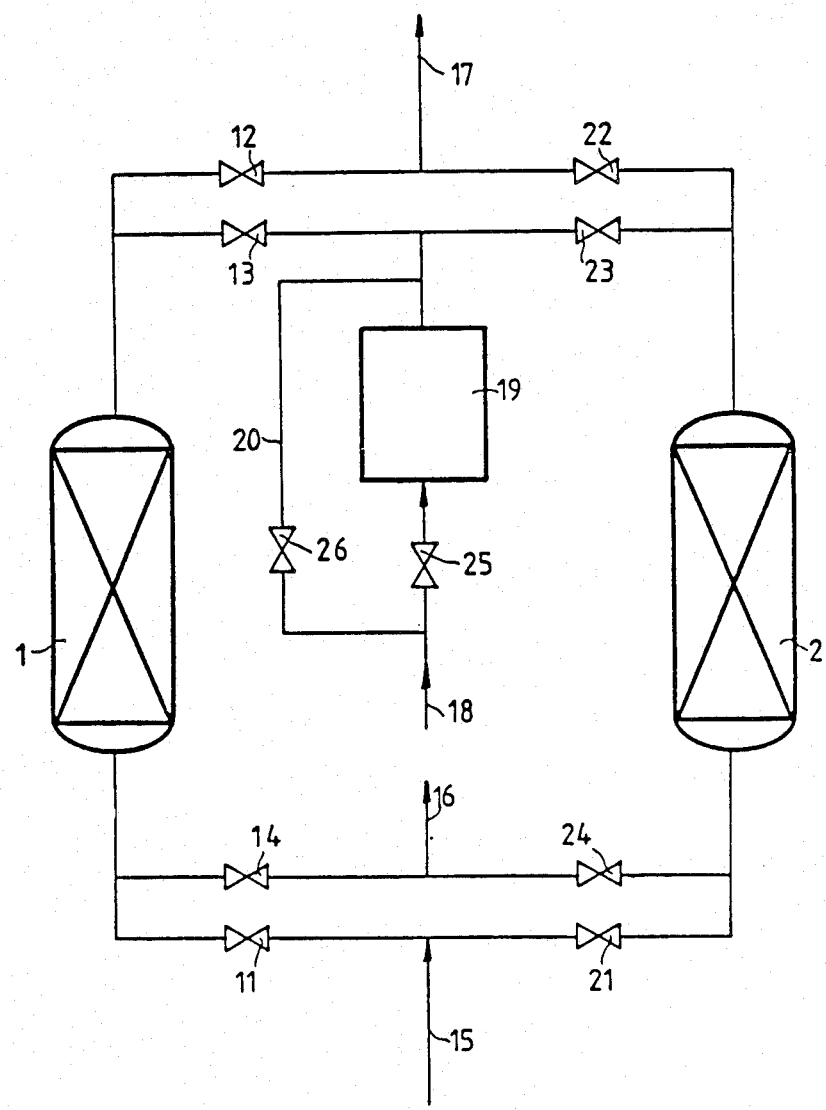
FIG. 4 is a schematic representation of an adsorption facility suitable for conducting the process.

Apparatus for conducting the process, shown schematically in FIG. 4, comprises two adsorbers 1 and 2 connected on their inlet sides via valves 11 and 14, and 21 and 24, respectively, to a crude gas conduit 15 and a residual gas conduit 16, respectively. On the outlet sides, the adsorbers are connected via valves 12 and 13, 22 and 23, respectively, to a product gas conduit 17 and to a regenerating gas feed conduit 18, respectively. A heater 19 is arranged in the regenerating gas feed conduit 18; this heater can be bypassed by bypass line 20. For this purpose, valves 25 and 26 are provided.

During operation, crude gas is introduced via conduit 15 (with valve 21 being closed) via the opened valve 11 to adsorber 1 and is dried while flowing through the adsorber. The product gas, with the valve 13 being closed, enters the product gas conduit 17 via the open valve 12.

At the same time, the adsorber 2, previously loaded with steam, is regenerated. For this purpose, regenerating gas is supplied via conduit 18 and initially enters the heater 19, with valve 26 being closed and valve 25 being opened; in the heater, the gas is heated to the regenerating gas temperature, e.g., 100°–200° C. The hot regenerating gas then enters, via the opened valve 23, the outlet end of adsorber 2 and effects, on account of its high temperature, desorption of the previously adsorbed steam. Regenerating gas enriched with steam leaves the adsorber at the inlet end and passes via the opened valve 24 into the residual gas conduit 16. After termination of the desorption phase, the adsorber 2 must be recooled to the adsorption temperature, i.e., for example, to ambient temperature. For this purpose, additional purge gas is utilized which, however, is conducted, with valve 25 being closed and valve 26 being opened, via the bypass line 20 past the heater 19.

Regeneration, i.e., the heating phase and subsequent cooling phase, of one adsorber, and the adsorption phase of the other adsorber are chronologically interrelated. After the adsorption phase in adsorber 1 and regeneration phase in adsorber 2 are completed, the crude gas stream 15 is conducted, by closing valves 11, 12, 23 and 24, as well as opening valves 21 and 22, through adsorber 2 while the regenerating phase is initiated for adsorber 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for drying a gaseous stream wherein the gaseous stream is fed, during an adsorption phase, to the inlet end of an adsorber and, after passing through an adsorption bed, the dried gaseous stream is withdrawn from the outlet end of the adsorber, and wherein, after termination of the adsorption phase, a regenerating gas introduced via the outlet end of the adsorber is passed through the adsorber at a sufficiently elevated temperature to desorb $H_2O$, and regenerating gas loaded with desorbed steam is withdrawn from the adsorber, said gaseous stream containing at least one compound tending to polymerize under the regnerating conditions of the adsorption process, the improvement wherein the adsorption bed is subdivided into at least two layers containing differing adsorbents, passing the gaseous stream through a first layer of adsorbent, said first layer selective for the adsorption of water, and then through a second layer of adsorbent also selective for water, the second layer traversed by the gaseous stream consisting essentially of an adsorbent having a lower adsorption capacity for said at least one polymerizble compound than the first layer.

2. A process according to claim 1, wherein the first layer is disposed within a zone of the adsorber attaining, during adsorption, an $H_2O$ loading of at least 50% of the equilibrium $H_2O$ loading attainable under the adsorption conditions.

3. A process according to claim 2, said first layer of the adsorption bed consisting essentially of a type 4A zeolitic molecular sieve, and the second layer consisting essentially of a type 3A zeolitic molecular sieve.

4. A process according to claim 1, said first layer being disposed within a zone of the adsorber saturated with steam during adsorption.

5. A process according to claim 3, said first layer extending over 10–60% of the adsorber length.

6. A process according to claim 5, said first layer consisting essentially of an adsorbent that is more stable mechanically and/or thermally than downstream layers.

7. A process according to claim 6, said first layer of the adsorption bed consisting essentially of a type 4A zeolitic molecular sieve, and the second layer consisting essentially of a type 3A zeolitic molecular sieve.

8. A process according to claim 5, said first layer of the adsorption bed consisting essentially of a type 4A zeolitic molecular sieve, and the second layer consisting essentially of a type 3A zeolitic molecular sieve.

9. A process according to claim 4, said first layer of the adsorption bed consisting essentially of a type 4A zeolitic molecular sieve, and the second layer consisting essentially of a type 3A zeolitic molecular sieve.

10. A process according to claim 1, said first layer extending over 10–60% of the adsorber length.

11. A process according to claim 10, said first layer consisting essentially of an adsorbent that is more stable mechanically and/or thermally than downstream layers.

12. A process according to claim 11, said first layer of the adsorption bed consisting essentially of a type 4A zeolitic molecular sieve, and the second layer consisting essentially of a type 3A zeolitic molecular sieve.

13. A process according to claim 10, said first layer of the adsorption bed consisting essentially of a type 4A zeolitic molecular sieve, and the second layer consisting essentially of a type 3A zeolitic molecular sieve.

14. A process according to claim 1, said first layer consisting essentially of an adsorbent that is more stable mechanically and/or thermally than downstream layers.

15. A process according to claim 14, said first layer of the adsorption bed consisting essentially of a type 4A zeolitic molecular sieve, and the second layer consisting essentially of a type 3A zeolitic molecular sieve.

16. A process according to claim 1, said first layer of the adsorption bed consisting essentially of a type 4A zeolitic molecular sieve, and the second layer consisting essentially of a type 3A zeolitic molecular sieve.

17. A process according to claim 1 wherein the adsorption bed which is subdivided into at least two layers containing different adsorbents is located within a single housing.

18. A process according to claim 1 wherein the adsorption bed is regenerated under a pressure of at least 10 bar.

* * * * *